United States Patent
Gruttadauria et al.

(10) Patent No.: US 7,917,604 B1
(45) Date of Patent: Mar. 29, 2011

(54) TECHNIQUES FOR OPERATING A DATA STORAGE ASSEMBLY VIA A SERIES OF WEB PAGES AND A COMMIT-AT-THE-END, WIZARD-STYLE BEHAVIOR

(75) Inventors: Brian R. Gruttadauria, Sutton, MA (US); Joseph Frank, Boulder, CO (US); Sigalit Adoot-Tari, Boulder, CO (US)

(73) Assignee: EMC Corporation, Hopkinton, MA (US)

( * ) Notice: Subject to any disclaimer, the term of this patent is extended or adjusted under 35 U.S.C. 154(b) by 575 days.

(21) Appl. No.: 11/824,187

(22) Filed: Jun. 29, 2007

(51) Int. Cl.
*G06F 15/16* (2006.01)

(52) U.S. Cl. ......... 709/220; 709/223; 707/762; 715/733

(58) Field of Classification Search .......... 709/220–226; 707/9, 10, 100–102, 104.1, 762; 715/733, 715/738

See application file for complete search history.

(56) References Cited

U.S. PATENT DOCUMENTS

| | | | |
|---|---|---|---|
| 5,987,506 A | 11/1999 | Carter et al. | |
| 5,992,737 A * | 11/1999 | Kubota | 235/380 |
| 6,615,258 B1 | 9/2003 | Barry et al. | |
| 7,020,758 B2 | 3/2006 | Fisk | |
| 7,243,116 B2 | 7/2007 | Suzuki et al. | |
| 2001/0047454 A1* | 11/2001 | Soderstrom et al. | 711/118 |
| 2002/0019908 A1* | 2/2002 | Reuter et al. | 711/112 |
| 2006/0133585 A1* | 6/2006 | Daigle et al. | 379/88.06 |
| 2007/0156856 A1* | 7/2007 | Shafron | 709/219 |

OTHER PUBLICATIONS

"File Watcher" printout of File Watcher directory as archived in 2000 by the Internet Archive Way Back Machine, URL on printout, pp. 1-7.*
Internet Archive Way Back Machine archive dates printout for "filewatcher.com" address. pp. 1-5. Printed Jan. 22, 2009.*

* cited by examiner

*Primary Examiner* — David Lazaro
(74) *Attorney, Agent, or Firm* — BainwoodHuang (57) ABSTRACT

A technique of operating a data storage assembly involves providing a series of web pages to a web browser and buffering a set of potential configuration settings from the web browser. The web browser is controlled by a user. The series of web pages details operational aspects of the data storage assembly. The set of potential configuration settings is arranged to direct future operation of the data storage assembly. The technique further includes receiving a commit command from the web browser after the set of potential configuration settings has been buffered. The technique further includes committing, in response to the commit command, a set of configuration changes on the data storage assembly based on the set of potential configuration settings to provide the user with a commit-at-the-end, wizard-style configuration behavior through the web browser.

18 Claims, 7 Drawing Sheets

TECHNIQUES FOR OPERATING A DATA STORAGE ASSEMBLY VIA A SERIES OF WEB PAGES AND A COMMIT-AT-THE-END, WIZARD-STYLE BEHAVIOR

BACKGROUND

A typical large-scale data storage system provides an integrated management application which enables a well-trained and technically-skilled administrator to manage the operation of the data storage system. Such an application typically includes a backup utility, a network management utility, and a resource tracking utility, among others.

Since it is expected that the administrator possesses a detailed understanding of how the data storage system is configured and how it operates, the data storage system preferably provides the administrator with a highly sophisticated interface. Such an interface is often relatively dry/cryptic graphical user interface (GUI) providing extensive detail and enabling advanced control, but may lack user-friendliness since it is presumed that the administrator has been well-trained on the use of the GUI. In particular, the selections and options offered by the GUI may include rather mundane menus and selection features to enable the administrator to manage the data storage system without much distraction.

In contrast, smaller scale data storage systems typically do not provide integrated management applications. Rather, a small scale data storage system generally provides multiple application-level utilities which a person can run on an individual basis. For example, in the context of a personal computer (PC) running Windows®, a technical user is capable of running Windows Explorer to manually access and manage files, a backup application to backup the files, a virus scanner to check the files for viruses.

SUMMARY

In contrast to the dry/cryptic GUIs provided by large-scale data storage systems, and the non-integrated utilities offered by smaller-scale data storage systems, an improved technique of operating a data storage system involves gathering configuration settings from a user through a series of user-friendly and easy-to-navigate web pages on a web browser. The series of web pages makes for an easy and enjoyable user experience (particularly for a novice user) because it betters the user's understanding of what actions will actually take place and helps guide the user through various management tasks. Once the user finishes providing the configuration settings, the user commits the configuration settings (e.g., by selecting an "apply" button on the web browser) in a commit-at-the-end, wizard-style manner. As a result, the user enjoys easy-to-understand guidance via the web pages. Moreover, the user does not need to worry about mis-configuring data storage parameters if switching web pages since configuration changes do not need to be committed until the very end of the session and are capable of being disregarded if not committed.

One embodiment is directed to a technique of operating a data storage assembly which involves providing a series of web pages to a web browser and buffering a set of potential configuration settings from the web browser. The web browser is controlled by a user. The series of web pages details operational aspects of the data storage assembly. The set of potential configuration settings is arranged to direct future operation of the data storage assembly. The technique further includes receiving a commit command from the web browser after the set of potential configuration settings has been buffered. The technique further includes committing, in response to the commit command, a set of configuration changes on the data storage assembly based on the set of potential configuration settings to provide the user with a commit-at-the-end, wizard-style configuration behavior through the web browser.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of operating a data storage system involves gathering configuration settings from a user through a series of user-friendly and easy-to-navigate web pages on a web browser. Once the user finishes providing the configuration settings, the user commits the configuration settings (e.g., by selecting an "apply" button on the web browser) in a commit-at-the-end, wizard-style manner. Accordingly, the user enjoys easy-to-understand guidance (e.g., help, illustrations for novice users, step-by-step input of certain configuration settings, etc.) offered by the web pages. Moreover, the user does not need to worry about inadvertently mis-configuring data storage parameters while the user switches between web pages since configuration changes do not need to be committed until the very end of the session, and since the changes are capable of being disregarded if not committed.

Figure 1:
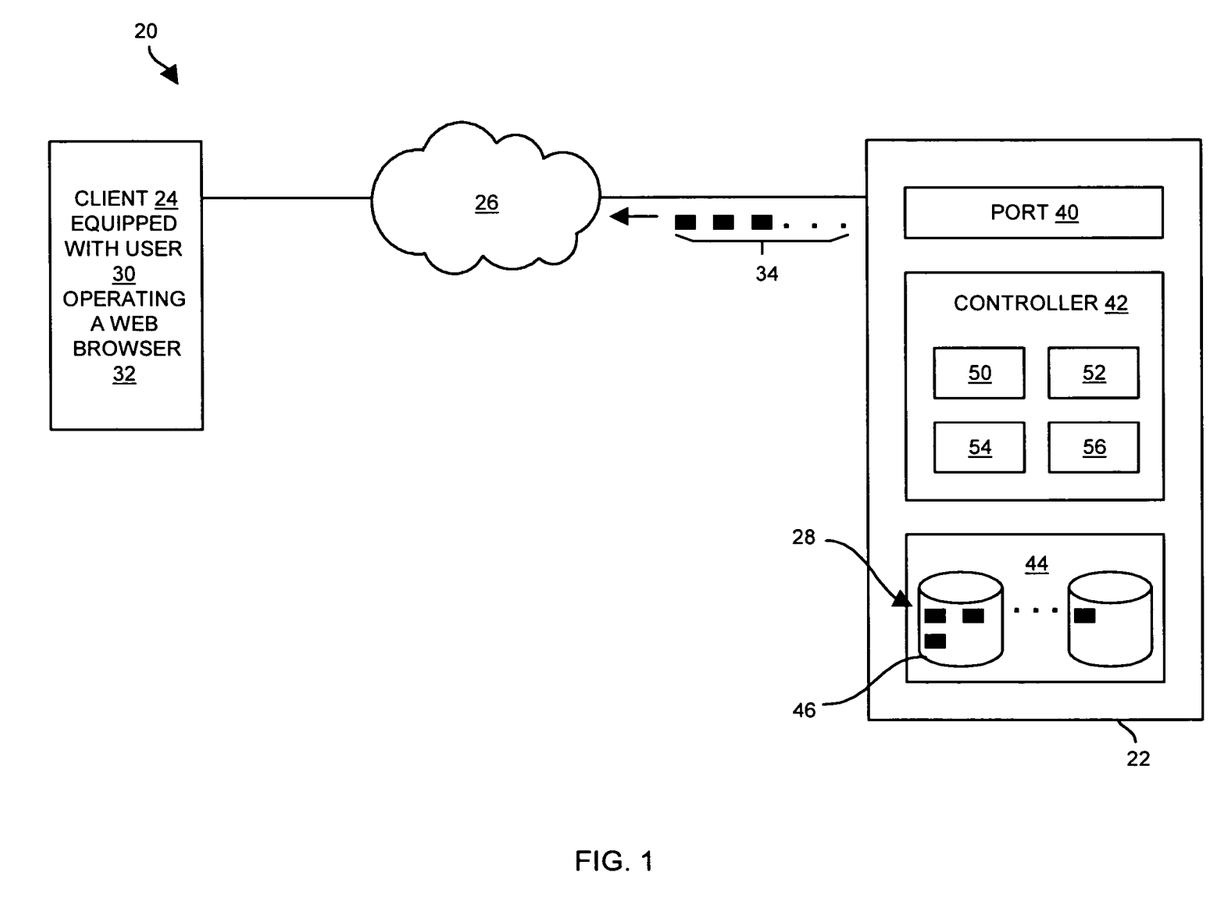
FIG. 1 is a block diagram of an electronic system arranged to interact with a user via a series of web pages which provide a commit-at-the-end, wizard-style configuration behavior to the user.

FIG. 1 is a block diagram of an operating environment 20 having an electronic system 22 and a client 24 which are connected via a communications medium 26 (e.g., buses, cables, a computer network, wireless transmissions, combinations thereof, etc.) illustrated generally in FIG. 1 as a network cloud. The electronic system 22 is arranged to store and retrieve user information 28 (e.g., files) on behalf of a user 30 operating a web browser (or similar application) 32 on the client 24.

During the processes of initial configuration and during ongoing management, the electronic system 22 is further configured to interact with the user 30 via a series of web pages 34 to provide a commit-at-the-end, wizard-style configuration behavior to the user 30. In particular, the electronic system 22 is arranged to dynamically construct the web pages 34 and walk the user 30 through setup and maintenance procedures in a wizard-style manner. As a result, the user 30 is able to view the electronic system 22 as a simple and easy to use storage management product with capabilities of providing an improved and guided understanding of what actions will actually take place in various management tasks prior to committing to those actions.

It should be understood that there are a variety of different ways to implement the client 24 and the electronic system 22. In some arrangements, the electronic system 22 resides at a particular location (e.g., a standalone or rack mount enclosure) which is separate from the location of the client 24 (e.g., a laptop computer, a personal computer, a workstation, etc. connected to the electronic system 22 through the communications medium 26). In other arrangements, the electronic system 22 and the client 24 are more tightly integrated, i.e., the client 24 is an I/O apparatus for the electronic system 22 (e.g., the client 24 is a keyboard, mouse and display monitor). Other arrangements are suitable as well.

As shown in FIG. 1, the electronic system 22 includes a port 40, a controller 42, and data storage assembly/array 44. The port 40 is arranged to provide access into the electronic system 22 from the outside. In arrangements where the client 24 is a separate standalone device (e.g., a personal computer) relative to the electronic system 22, the port 40 of the electronic system 22 is a network interface (e.g., NIC) configured to carry out network communications (e.g., TCP/IP) with the client 24 as well as enable storage and retrieval of the user information 28 (e.g., uploads and downloads). In arrangements where the client 24 is merely an I/O apparatus, the port 40 is a display port (e.g., a graphics interface or display card) configured to render a view of the web browser 32 on a display or television device with the code for the browser 32 actually running on the electronic system 22.

The data storage assembly 44 includes a set of magnetic disk drives 46 which is arranged to store and retrieve the user files 28 in a non-volatile manner. The data storage assembly 44 is configured to carry out efficient and fault tolerant data storage operations. In some arrangements, the data storage assembly 44 is configurable to carry out one of a variety of RAID (redundant array of independent drives) levels such as RAID 1 (mirroring), RAID 5 (striping with parity), RAID 10 (mirrored pairs), and so on.

The controller 42 is arranged to control operation of the data storage assembly 44. To this end, the controller 42 includes, among other things, processing circuitry 50 (i.e., one or more processors), general memory 52, a foreign language database 54, and a search database 56. The processing circuitry 50 runs an operating system and a set of applications to essentially form the processing engine of the electronic system 22, e.g., for dynamic web page construction, for user authentication and access, for carrying out backups and virus scanning, etc. The general memory 52 operates as a main memory for the operating system and applications, as a cache for various optimizations and improved response times, and as a buffer for temporarily storing potential configuration settings and changes identified by the user 30, among other things. The foreign language database 54 stores text captions for different selectable foreign languages (e.g., English, French, Spanish, Chinese, etc.). The search database 56 stores search data (e.g., hash tables) which enable the user to carry-out quick content searches of the files 28 for particular character strings. Further details will now be provided with reference to FIG. 2.

Figure 2:
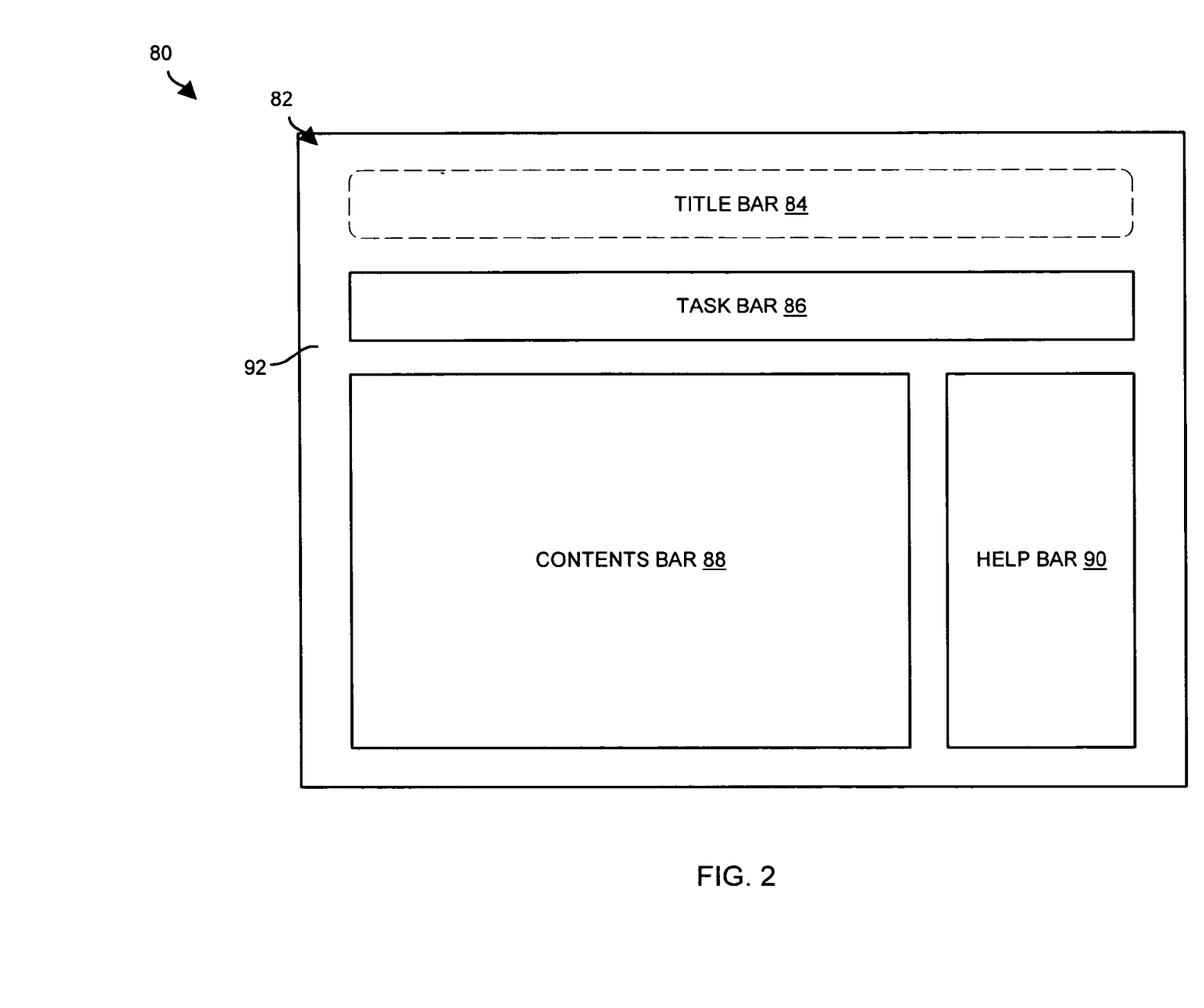
FIG. 2 is a block diagram of a general web page layout provided by the electronic system of FIG. 1.

FIG. 2 is a block diagram of a general web page layout 80 provided by the electronic system 22 to the client 24 through the communications medium 26. The layout 80, which is displayed on the browser 32 of the client 24, includes multiple panes 82 such as a title bar 84, a task bar 86, a contents bar 88 and a help bar 90.

The title bar 82 is arranged as the top pane 82. The title bar 82 preferably includes a company name and logo (e.g., the manufacturer of the electronic system 22). The top pane 82 is shown delineated with dashed lines to illustrate that, by way of example, the top pane 82 is capable of blending in with the background 92 of the layout 80.

The task bar 86 is arranged to display commonly used operations (e.g., a dashboard or control panel, shared folder management, user account management, setting changes, etc.). In some arrangements, the task bar 86 presents these operations in the form of selectable tabs. In some arrangements, the task bar 86 further presents links to standard operations such as a "Logout" link which enables the user 30 to log out of a current session, and a "Help" link which enables the user 30 to access portions of an electronic user guide.

The contents bar 88 is arranged to show information regarding a particular task or operation being carried out. In particular, the user 30 is capable of clicking on a selectable tab in the task bar 86 to navigate to a particular task or operation corresponding to that tab.

The help bar 90 is arranged to show the context sensitive help of the particular task or operation currently being carried out. In particular, as the user 30 navigates through various tasks/operations in the contents bar 88, the help bar 90 is arranged to automatically update with guidance corresponding to the specific task/operation shown in the contents bar 88. As a result, the user 30 is able to view help for the particular task or operation without explicitly hitting any help link.

It should be understood that the various panes 82 are positioned in the layout 80 as shown in FIG. 2 to provide the user 30 with a comfortable and easy-to-understand look and feel. However, other positions are suitable for use as well. Further details will now be provided with reference to FIG. 3.

Figure 3:
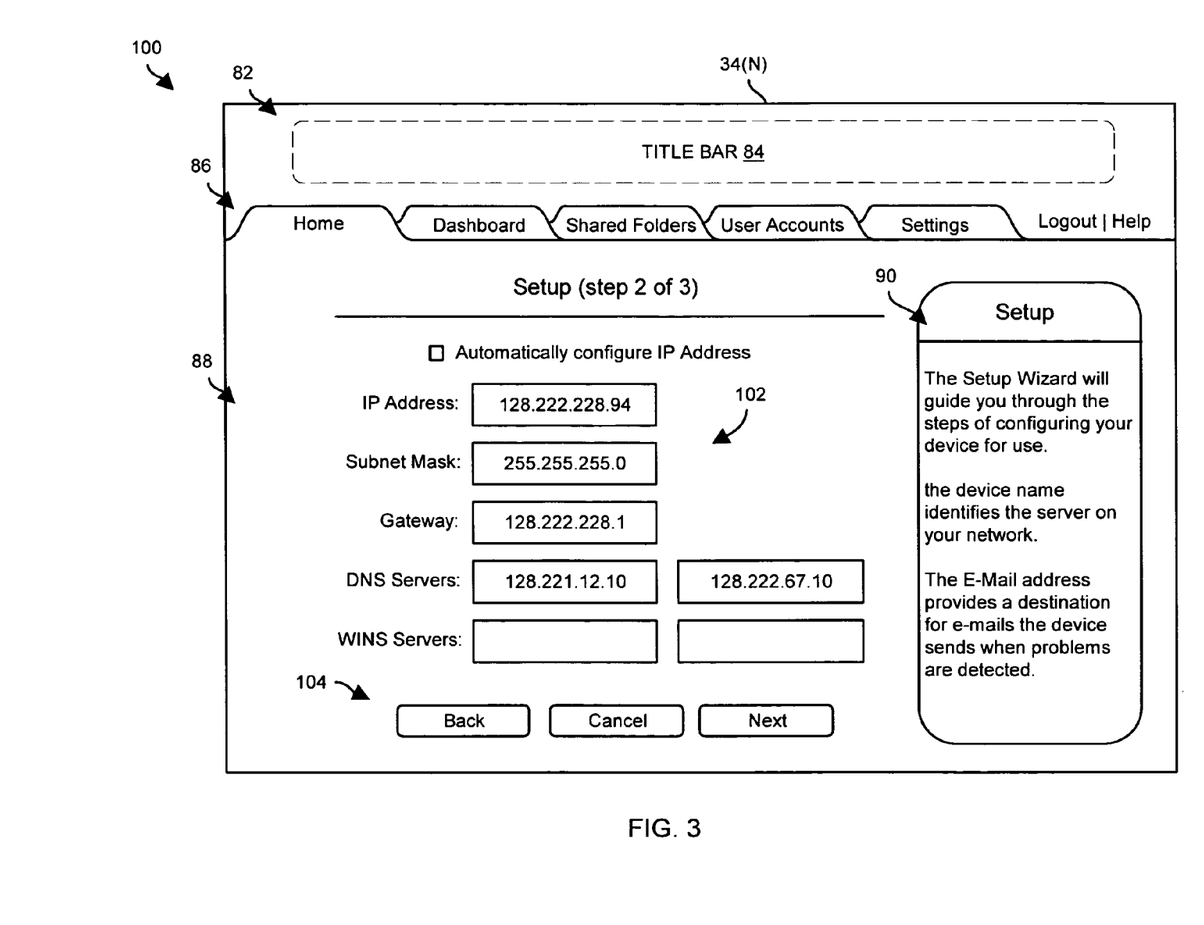
FIG. 3 is a detailed view of a main web page provided by the electronic system of FIG. 1.

FIG. 3 is a detailed view 100 of a web page 34(N) provided by the electronic system 22 to the client 24. The web page 34(N) is an example of a particular web page 34 of the series of web pages 34 which guides the user 30 through a wizard-style session of collecting and committing to a set of configuration settings.

Currently, the "Home" tab has been selected, and the user 30 is carrying out a setup process to setup the electronic system 22. In particular, the user 30 has entered potential configuration settings 102 via the web page 34(N) as part of the process of initially setting up the system 22. It should be understood that the particular correspondence between the "Home" tab and the network information of the potential configuration settings 102 is provided by way of example only. Paths other than a "Home" tab (e.g., a "Settings" tab) may also be suitable for reaching the web page 34(N) which queries the user 30 for the network information.

Once the user 30 has completed entry of certain settings 102, the user proceeds to a different screen by clicking on one of the buttons 104 located at the bottom of the page 100. Along these lines, in the manner of a setup wizard, the user 30 is capable of clicking on the "Next" button which would cause the electronic system 22 to buffer the entered configuration settings 102 in the controller memory 52 and provide the next web page 34(N+1) in the series of web pages 34 (also see FIG. 1). As each web page 34 displays on the browser 32 of the client 24, the help bar 90 automatically updates with new information to guide the user 30 incrementally through the setup process. Moreover, the electronic system 22 dynamically constructs each web page 34 thus enabling the electronic system 22 to dynamically customize the series of web pages 34 on the fly. As a result, the next web page 34(N+1) may be different depending on the selections made by the user in the preceding web pages 34.

If the user 30 reaches the last web page 34 in the series, the user 30 is prompted with an "Apply" button, i.e., button displaying the word "Apply" in place of the "Next" button. The "Apply" button enables the user 30 to commit the electronic system 22 to the buffered configuration settings 102 and thus modify the operation of the electronic system 22 in a commit-at-the-end manner.

Alternatively, the user 30 is capable of clicking the "Back" button at any point during the series of web pages 34 to re-enter a portion of the potential configuration settings 102. For example, if the user 30 clicks the "Back" button from the web page 34(N), this would cause the electronic system 22 to provide the previous web page 34(N–1) in the series of web pages 34. This may be useful if the user 30 needs to retrace part of the setup procedure to correct some information that had been entered earlier. Again, since the electronic system 22 provides this wizard-style behavior, the earlier entered configuration settings 102 had been buffered but not committed and thus are easy to change at this point.

As another alternative, the user 30 is capable of clicking the "Cancel" button to cancel the setup process. This may be useful if, after interacting through a portion of the series of web pages 34, the user 30 decides not to complete the process at this time. Again, due to the wizard-style behavior provided by the electronic system 22, the potential configuration settings 102 have been buffered but not yet committed. Accordingly, upon selection of the "Cancel" button, the electronic system 22 easily discontinues the setup process and does not make the configuration setting changes. Further details will now be provided with reference to FIG. 4.

Figure 4:
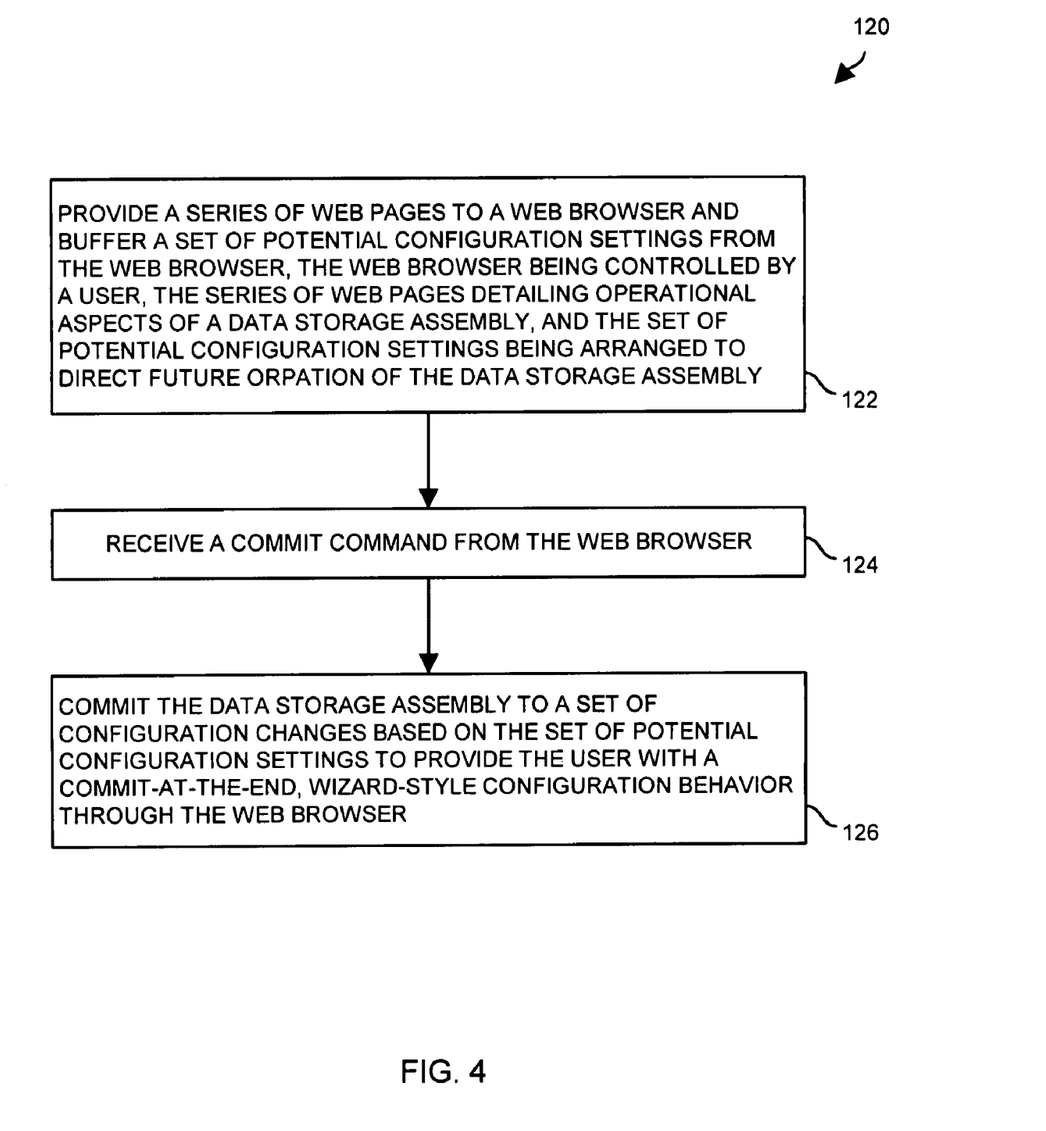
FIG. 4 is a flowchart of a procedure which is performed by the electronic system of FIG. 1.

FIG. 4 is a flowchart of a procedure 120 which is performed by the electronic system 22 when obtaining and effectuating new configuration settings 102 from the user 30. In step 122, the controller 42 of the electronic system 22 provides the series of web pages 34 to the web browser 32 through the port 40 and buffers a set of potential configuration settings 102 from the web browser 32 through the port 40. Accordingly, the controller 42 effectively interacts with the user 30 by incrementally detailing operational data storage aspects while accumulating configuration settings 102 in the memory 52 (FIG. 1) which, if committed, will eventually be used to direct future operation of the data storage assembly 44. As mentioned earlier, the electronic system 22 is capable of dynamically constructing the web pages 34 thus tailoring the next web page 34 based on earlier potential configuration settings 102 provided by the user 30.

In step 124, the controller 42 receives a commit command from the web browser 32 (e.g., when the user 30 clicks the "Apply" button). Here, the user 30 has decided to commit to the earlier entered and buffered configuration settings 102.

In step 126, the controller 42 invokes a set of configuration changes in its operation of the data storage assembly 44 based on the configuration settings 102 in response to receipt of the commit command. This commit-at-the-end, wizard-style behavior enables the user 30 to be incrementally guided through various management tasks, a particularly valuable feature to a novice user. Moreover, the user 30 had safely maintained the option of having the controller 42 disregard the buffered configuration settings 102 up until the point of committing to the changes by clicking the "Apply" button which may be helpful if, after going through several web pages 34, the user then realizes that an error was made in some of the buffered configuration settings 102. For illustration purposes, some configuration change examples will now be provided with reference to FIG. 5.

Figure 5:
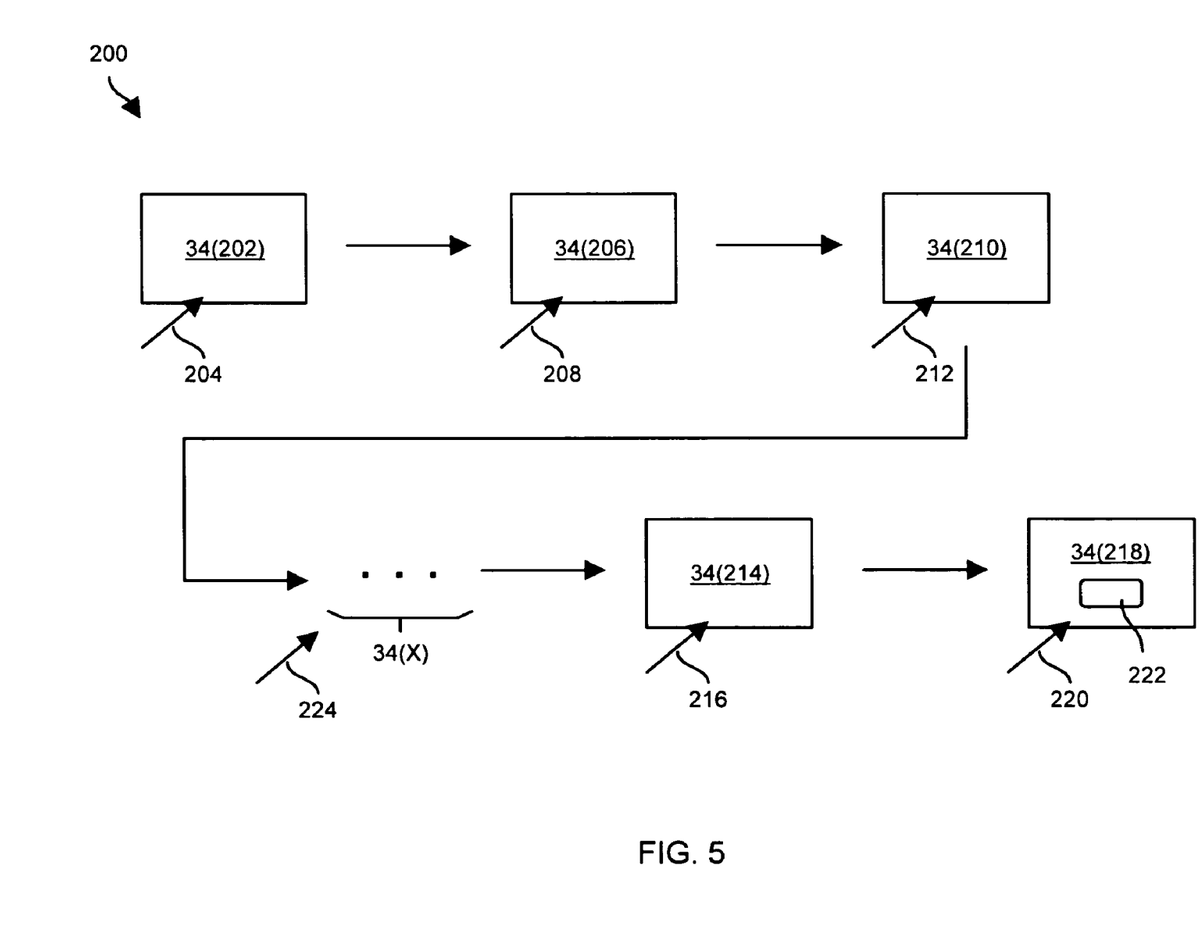
FIG. 5 is a flow diagram of a series of web pages involved in setting up the electronic system of FIG. 1.

FIG. 5 is a flow diagram 200 of an example series of web pages 34 which are involved in an initial setup of the electronic system 22. During interaction with the user 30 through the series of web pages 34, the electronic system 22 provides information to the user 30 and buffers potential configuration settings 102 along the way.

First, the electronic system 22 provides an initial login web page 34(202) to the client 24. The user 30 enters a username and password 204 which is authenticated by the electronic system 22. Initially, an administrator's username and password 204 can be preset. However, after the initial setup, other username and passwords 204 can be put into effect for subsequent sessions. This level of authentication provides useful security particularly if the environment 20 is a computer network which is publicly accessible.

Next, the electronic system 22 provides a language selection web page 34(206) which prompts the user 30 to select one of multiple foreign languages. It should be understood that the electronic system 22 dynamically constructs web pages 34 and, following selection of the particular language (e.g., English, Chinese, etc.), accesses captions (i.e., character/text strings) from the foreign language database 54 (FIG. 1) to construct subsequent web pages 34 in the selected foreign language for the user 30. That is, upon receipt of a foreign language preference 208, the electronic system 22 provides subsequent web pages 34 in the series of web pages 34 detailing the operational aspects of the data storage assembly 44 in the particular foreign language based on the foreign language preference 208 (i.e., future web pages 34 are dynamically constructed in the selected foreign language).

Subsequently, the electronic system 22 provides a naming web page 34(210) which prompts the user 30 for additional information 212 including a name for the electronic system 22 and an email address to which the electronic system 22 will send notifications. As a result of the additional information 212, the electronic system 22 is now able to carryout additional operations such as notify the user 30 of updates, status changes, etc. via an email message to the entered email address.

At some point, the electronic system 22 provides a network configuration web page 34(214) which prompts the user 30 to provide network-related input 216 such as particular network information. The user 30 can allow the electronic system 22 to automatically configure various network details, or manually provide specific network details (e.g., static addresses, etc.). FIG. 3 is an example of a web page 34 which is suitable for use as the network configuration web page 34(208) prompting the user 30 for the network-related input 216.

Then, the electronic system 22 provides a web page 34(218) which prompts the user 30 to select time and date information 220 for the electronic system 22. In some arrangements, the electronic system 22 enables the user to select the time zone and direct the electronic system 22 to automatically synchronize with an Internet time server.

In the last web page of the series of web pages 34 (e.g., the web page 34(218)), the electronic system 22 offers an "Apply" button 222 rather than a "Next" button within the last web page 34. When the user 30 clicks on the "Apply" button 222, the electronic system 22 commits configuration changes based on the buffered settings 102 which were accumulated along the way (see arrows 204, 208, 212, 216, and 220 in FIG. 5).

At any point prior to clicking the "Apply" button 222, the user is capable of having the electronic system 22 disregard the potential configuration settings 102 since they are not yet committed. To direct the electronic system 22 to disregard the potential configuration settings 102, the user 30 simply clicks a "Cancel" button which is offered on all of the web pages 34 in the example series. This feature may be particularly useful to the user 30 if the user 30 wishes to simply explore some of the capabilities and actions offered by the electronic system 22 (e.g., the user 30 is simply "test driving" the configuration procedure of the electronic system 22), but when the user 30 is not ready to commit to particular settings.

It should be understood that the particular order of web pages 34 in this example series of web pages 34 is capable of being different than what was shown in FIG. 5. It should be further understood that additional web pages 34(X) can be included within the series to obtain additional information 224 from the user 30. Further details will now be provided with reference to FIG. 6.

Figure 6:
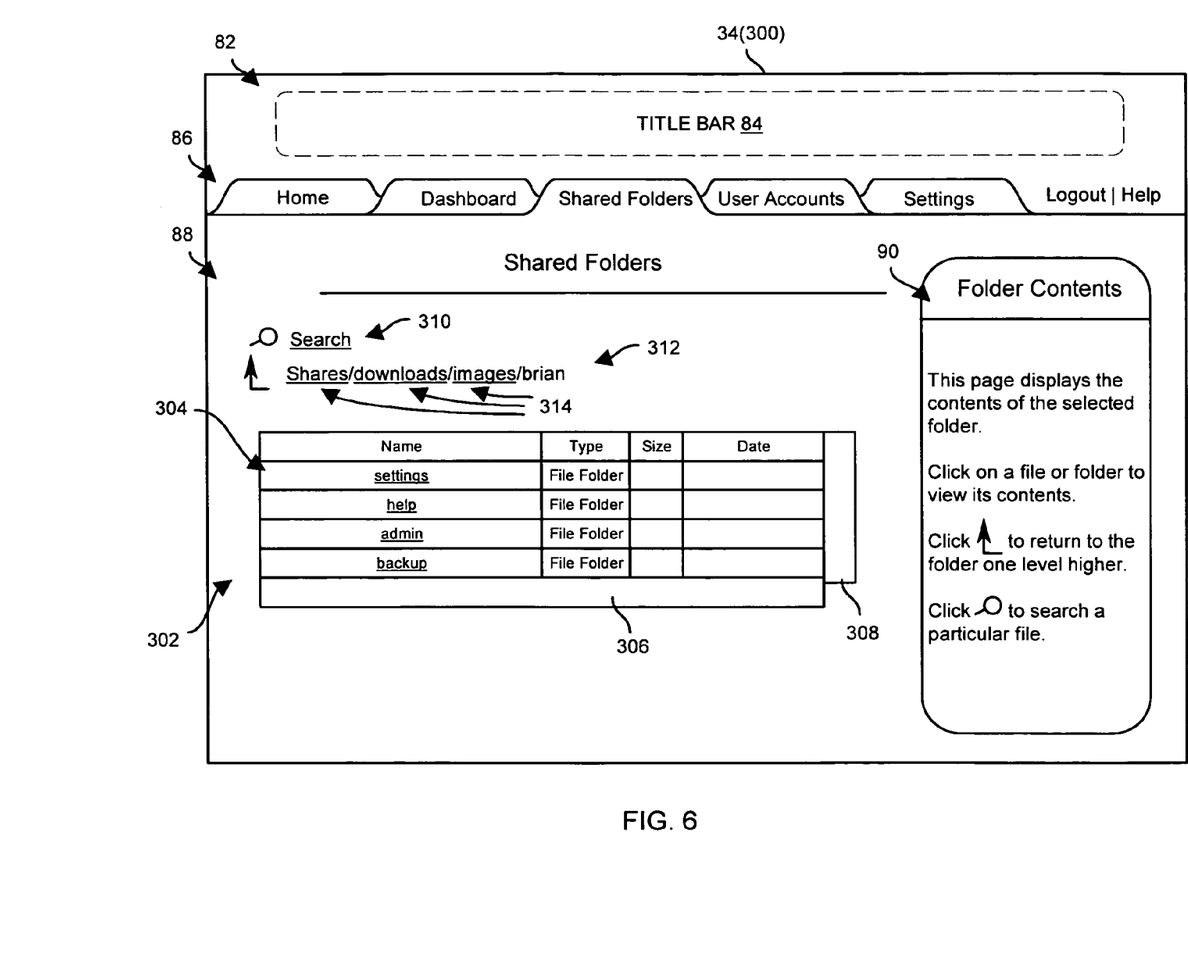
FIG. 6 is a file listing web page provided by the electronic system of FIG. 1.

FIG. 6 is a view of a file listing web page 34(300) which shows certain navigational features provided by the electronic system 22. Here, the user 30 has clicked on the "Shared Folders" tab in the task bar 86 to view the first "Shared Folders" contents page in the contents bar 88. In particular, it should be understood that the electronic system 22 provides the capability to share folders among multiple users 30 (or perhaps even publicly). For a particular user 30, the electronic system 22 provides the web page 34(300) that allows the user 30 to navigate through different subfolders that the user 30 is authorized to access.

As shown in FIG. 6, the contents bar 88 of the web page 34(300) provides a listing 302 of the contents 304 (e.g., particular files and subfolders) residing in a current subfolder. In this example, there are four subfolders "settings", "help", "admin", and "backup" located within the current subfolder "Shares". The listing 302 further includes a horizontal scroll bar 306 for horizontal scrolling, and a vertical scroll bar 308 for vertical scrolling.

As further shown in FIG. 6, the contents bar 88 further provides a search link 310 and a subfolder pathway 312. In connection with the search link 310, the electronic system 22 provides a content searching capability. The search link 310 leads to a searching web page that prompts the user 30 for search criteria (e.g., character string). To this end, recall that the controller 42 includes a search database 56 (also see FIG. 1). The search database 56 includes hash information that enables the controller 42 to quickly search and identify a listing of stored files 28 (also see the data storage assembly 44 in FIG. 1), at the level of the current subfolder and lower, containing a particular character string entered by the user 30.

To dynamically populate the search database 56, the controller 42 is arranged to constantly maintain the search database 56 with updated information regarding the files 28 stored within the data storage assembly 44. To this end, the controller 42 updates the search database 56 in response to uploading a new file 28 into the data storage assembly 44 to capture hash information regarding those new files 28. Furthermore, the controller 42 updates the search database 56 in response to closing an existing file 28 in the data storage assembly 44 to capture any additions and/or changes in the contents of the existing file 28.

In connection with the subfolder pathway 312, the electronic system 22 provides enhanced navigational capabilities by offering the user 30 links to each subfolder listed in the subfolder pathway 312. Along these lines, the subfolder pathway 312 includes multiple parent subfolder names 314 ("Shares", "downloads", and "images") ahead of the current subfolder name 314 ("brian"). Each subfolder name 314 is separated by a "I" to provide an easily recognizable path format to the user 30.

Moreover, each parent subfolder name 314 is actually a hypertext link (illustrated by the underlines) to a new web page 34 listing contents of a corresponding subfolder associated with that parent subfolder name 314. Accordingly, the user 30 is able to provide a selection command to the controller 42 by clicking on one of the hypertext links. That is, if the user 30 clicks on a particular parent subfolder name 314, the controller 42 returns, to the browser 32 on the client 24) a new web page 34 having a listing of the files 28 in the subfolder corresponding to that particular parent subfolder name 314.

For example, if the user 30 clicks on the link "downloads" within the subfolder pathway 314, the controller 42 provides a new web page 34 listing the subfolders and/or files within "Shares/downloads". Here, "Shares" would now be a parent subfolder name 314, and "downloads" would be the new current subfolder. Further details will now be provided with reference to FIG. 7.

Figure 7:
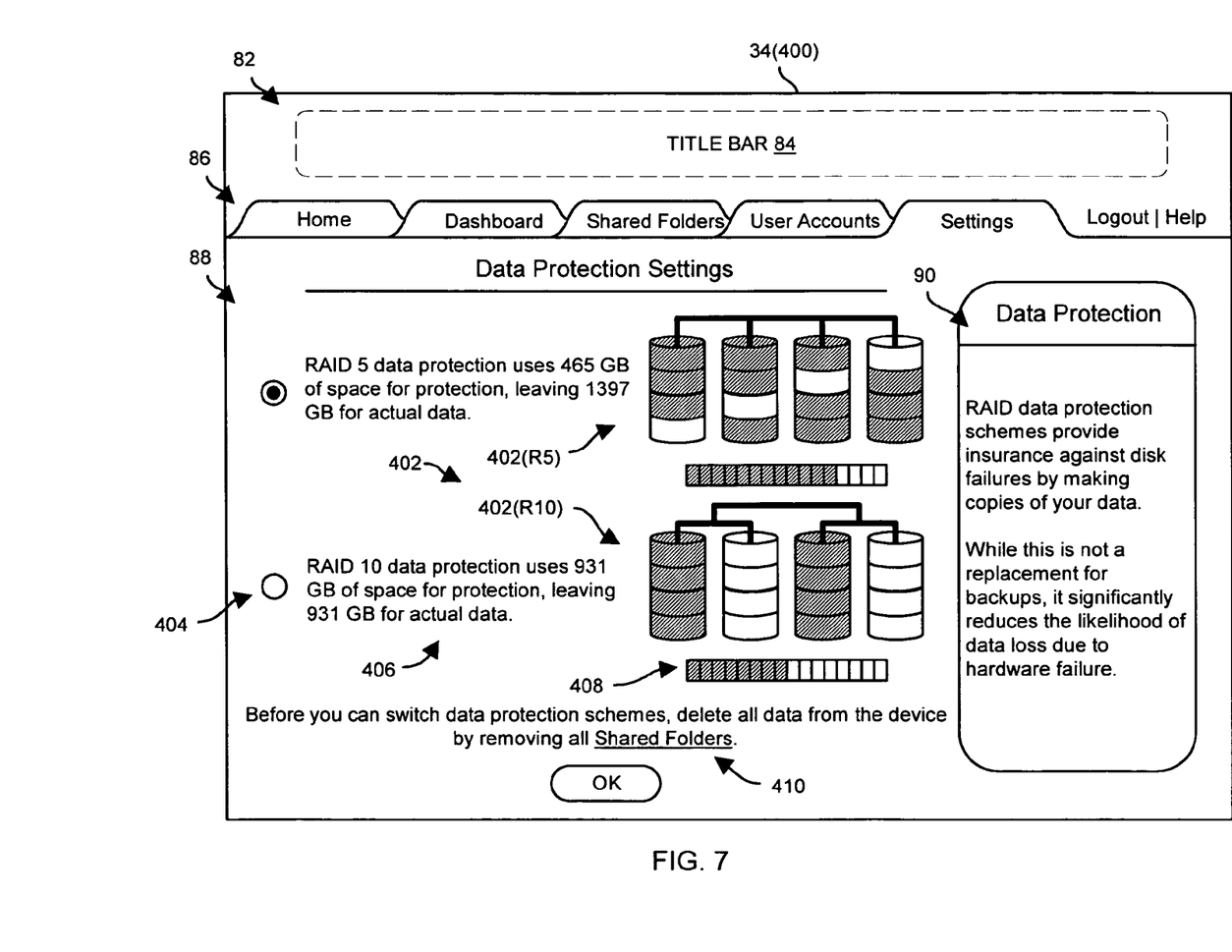
FIG. 7 is a RAID level web page provided by the electronic system of FIG. 1.

FIG. 7 is a RAID level web page 34(400) which requests a RAID level preference from the user 30. In particular, the web page 34(400) prompts the user 30 for a particular RAID protection scheme among multiple available RAID protection schemes and displays pictorial disk views 402 of each available RAID protection scheme. When the user 30 identifies a RAID level preference via a radio button 404, and clicks the "OK" button, the electronic system 22 responds by directing the data storage assembly 44 to carryout that RAID protection scheme corresponding to the identified RAID level preference.

Due to the particular data presentation provided by the web page 34(400), the user 30 is well-guided, thus enabling even a novice user to make an informed decision regarding data protection. In particular, as shown in FIG. 7, the help bar 90 automatically updates with additional RAID information. Furthermore, there is text 406 and extra diagrams 408 within the contents bar 88 describing aspects of the different available RAID protection schemes. Moreover, there is a hyperlink 410 to a shared folder management page (e.g., see the page 34(300) in FIG. 6) in the event that the data storage assembly 44 is not yet ready to carryout a change to the RAID protection scheme (i.e., in the example of FIG. 7, changing the RAID protection scheme further requires deletion of earlier-stored data in the data storage assembly 44). Such features assist the user 30 with enhanced control of the electronic system 22.

By way of example only, the electronic system 22 allows the user 30 to select between RAID 5 and RAID 10 (see the radio buttons 404) and displays a RAID 5 pictorial disk view 402 (R5) and a RAID 10 pictorial disk view 402 (R10). These views make it visually clear to the user 30 how data is stored in the data storage array 44. Other RAID levels are suitable for use as well.

At this point, it should be understood that various other features are capable of being combined with the above-described aspects of the electronic system 22. For example, as illustrated in some of the web pages 34, the electronic system 22 provides access to a "Dashboard" which provides an overview of the electronic system 22. Here, the electronic system 22 provides a dynamically constructed dashboard web page 34 to the browser 32 to display a high level view of the state of the electronic system 22. Such a view preferably includes disk utilization information, device status, backup status, and virus scan information, among other things. Additionally, the dashboard web page 34 provides links to more detailed web pages 34 on these various aspects of the electronic system 22 (e.g., a web page 34 to more particularly view certain aspects of system health, a web page 34 to test a particular device, a web page 34 to control backups, a web page to run and/or set virus scanning parameters, etc.).

As another example, the electronic system 22 enables the user 30 to precisely control various security aspects via security web pages 34. Such aspects include domain security, public access to certain subfolders and files, and so on.

As described above, an improved technique of operating a data storage system involves gathering potential configuration settings 102 from a user 30 through a series of web pages 34 on a web browser 32. The series of web pages 34 makes for an easy and enjoyable user experience because it betters the user's understanding of what actions will actually take place and helps guide the user through various management tasks. Once the user 30 finishes providing the potential configuration settings 102, the user 30 commits the system to the configuration settings (e.g., by selecting an "apply" button on the web browser) in a commit-at-the-end, wizard-style manner. As a result, the user 30 enjoys easy-to-understand guidance along the way via the web pages 34. Moreover, the user 30 does not need to worry about mis-configuring data storage parameters if switching web pages 34 since configuration changes do not need to be committed until the very end of the session and are capable of being disregarded if not committed.

While various embodiments of the invention have been particularly shown and described, it will be understood by those skilled in the art that various changes in form and details may be made therein without departing from the spirit and scope of the invention as defined by the appended claims.

For example, the particular locations of various links, buttons and controls within the web pages 34 is capable of varying among different embodiments. As an example, certain links such as above-mentioned "Logout" link and "Help" link were described above as being part of the task bar 86. Alternatively, the "Logout" link and "Help" link are capable of residing in a different location such as between the task bar 86 and the title bar 84 (e.g., on a different line with the horizontal position being the same as illustrated in FIGS. 3 and 6-7).

What is claimed is:

1. A method of operating a data storage assembly, the method comprising:
   providing, from circuitry of an electronic system, a series of web pages dynamically constructed on the fly to a web browser and buffering a set of potential configuration settings from the web browser, the web browser being controlled by a user, the series of web pages detailing operational aspects of the data storage assembly, the series of web pages including a help bar that automatically updates with new information to guide the user incrementally through a setup process, and the set of potential configuration settings being arranged to direct future operation of the data storage assembly;
   after the set of potential configuration settings has been buffered, receiving, at the circuitry of the electronic system, a commit command from the web browser;
   in response to the commit command, committing a set of configuration changes on the data storage assembly by the circuitry of the electronic system based on the set of potential configuration settings to provide the user with a commit-at-the-end, wizard-style configuration behavior through the web browser; and
   providing a file listing web page to the browser, the file listing web page rendering a list of files stored within a current subfolder of the data storage assembly, and displaying a subfolder pathway having (i) at least one parent subfolder name, (ii) a current subfolder name corresponding to the current subfolder, and (iii) a "/" separator between each subfolder name of the subfolder pathway, each parent subfolder name being a selectable hypertext link arranged to open another web page which displays a list of files stored within a subfolder corresponding to that parent subfolder name;
   wherein providing the file listing web page to the browser, and displaying the subfolder pathway includes: sending, within the file listing web page, multiple hypertext links to open other web pages from the circuitry of the electronic system, and outputting the multiple hypertext links in a row within the web browser, each hypertext link being separated by the "/" separator to form a file pathname which is viewable by the user, and each hypertext link in the row corresponding to a lower subfolder which is selectable when the user activates that hypertext link;
   wherein the current subfolder of the data storage assembly resides on a non-volatile storage area of a set of magnetic disk drives of the data storage assembly; and wherein providing the file listing web page to the browser, and displaying the subfolder pathway further includes sending, within the file listing web page, multiple filename links as the list of files stored within the current subfolder of the data storage assembly, each filename link pointing to a particular corresponding user file (i) stored in the non-volatile storage area of the set of magnetic disk drives of the data storage assembly and (ii) belonging to the user of the electronic system; and
   wherein providing the file listing web page to the browser, and displaying the subfolder pathway includes: sending, within the file listing web page, multiple hypertext links to open subfolders of the electronic system that the user is authorized to access.

2. A method as in claim 1 wherein providing the series of web pages to the web browser includes:
   providing a language selection web page to the web browser, the language selection web page prompting the user to identify a language preference for a particular language among multiple selectable languages; and
   upon receipt of the language preference, providing subsequent web pages detailing the operational aspects of the data storage assembly in the particular language based on the language preference.

3. A method as in claim 2 wherein providing the subsequent web pages detailing the operational aspects of the data storage assembly in the particular language based on the language preference includes:
   dynamically constructing the subsequent web pages from a language database which stores captions in the multiple selectable languages.

4. A method as in claim 1, further comprising:
   storing a set of files in the data storage assembly;
   maintaining a search database of searchable content within the set of files;
   in response to a search command having a particular character string, accessing the search database to identify files having the particular character string within the set of files stored in the data storage assembly; and
   providing a search result web page to the web browser, the search result web page listing the files having the particular character string within the set of files stored in the data storage assembly.

5. A method as in claim 4 wherein maintaining the search database includes:
   updating the search database in response to uploading a new file into the data storage assembly.

6. A method as in claim 4 wherein maintaining the search database includes:
 updating the search database in response to closing an existing file in the data storage assembly.

7. A method as in claim 1, further comprising:
 receiving a selection command identifying a particular hypertext link arranged to open a web page which displays a list of files stored within a particular subfolder corresponding to a particular subfolder name displayed within the subfolder pathway; and
 providing another file listing web page to the browser, the other file listing web page rendering another list of files stored within a new current subfolder of the data storage assembly, and displaying a new subfolder pathway having (i) at least one parent subfolder name, (ii) a new current subfolder name corresponding to the new current subfolder, and (iii) a "/" separator between each subfolder name of the new subfolder pathway.

8. A method as in claim 1, further comprising:
 providing a RAID level selection web page to the web browser, the RAID level selection web page (i) prompting the user to identify a RAID level preference identifying a particular RAID protection scheme among multiple available RAID protection schemes and (ii) displaying a pictorial disk view of each available RAID protection scheme.

9. A method as in claim 8, further comprising:
 receiving, from the web browser, the RAID level preference identifying the particular RAID protection scheme, the data storage assembly being arranged to commit to the particular RAID protection scheme in response to (i) deletion of earlier-stored data in the data storage assembly, (ii) receipt of the RAID level preference, and (iii) receipt of the commit command.

10. An electronic system, comprising:
 a port arranged to communicate with a web browser;
 a data storage assembly arranged to store and retrieve data on behalf of the user; and
 a controller coupled to the port and to the data storage assembly, the controller being arranged to:
  provide a series of web pages dynamically constructed on the fly to a web browser through the port and buffer a set of potential configuration settings from the web browser through the port, the web browser being controlled by a user, the series of web pages detailing operational aspects of the data storage assembly, the series of web pages including a help bar that automatically updates with new information to guide the user incrementally through the setup process, and the set of potential configuration settings being arranged to direct future operation of the data storage assembly,
  after the set of potential configuration settings has been buffered, receive a commit command from the web browser through the port,
  in response to the commit command, commit a set of configuration changes on the data storage assembly based on the set of potential configuration settings to provide the user with a commit-at-the-end, wizard-style configuration behavior through the web browser, and
  provide a file listing web page to the browser, the file listing web page rendering a list of files stored within a current subfolder of the data storage assembly, and display a subfolder pathway having (i) at least one parent subfolder name, (ii) a current subfolder name corresponding to the current subfolder, and (iii) a "/" separator between each subfolder name of the subfolder pathway, each parent subfolder name being a selectable hypertext link arranged to open another web page which displays a list of files stored within a subfolder corresponding to that parent subfolder name,
 wherein the controller, when providing the file listing web page to the browser, and displaying the subfolder pathway, is arranged to:
  sending, within the file listing web page, multiple hypertext links to open other web pages from the circuitry of the electronic system, and
  outputting the multiple hypertext links in a row within the web browser, each hypertext link being separated by the "/" separator to form a file pathname which is viewable by the user, and each hypertext link in the row corresponding to a lower subfolder which is selectable when the user activates that hypertext link,
 wherein the current subfolder of the data storage assembly resides on a non-volatile storage area of a set of magnetic disk drives of the data storage assembly;
 wherein providing the file listing web page to the browser, and displaying the subfolder pathway further includes sending, within the file listing web page, multiple filename links as the list of files stored within the current subfolder of the data storage assembly, each filename link pointing to a particular corresponding user file (i) stored in the non-volatile storage area of the set of magnetic disk drives of the data storage assembly and (ii) belonging to the user of the electronic system, and
 wherein providing the file listing web page to the browser, and displaying the subfolder pathway includes: sending, within the file listing web page, multiple hypertext links to open subfolders of the electronic system that the user is authorized to access.

11. An electronic system as in claim 10 wherein the controller, when providing the series of web pages to the web browser, is arranged to:
 provide a language selection web page to the web browser, the language selection web page prompting the user to identify a language preference for a particular language among multiple selectable languages; and
 upon receipt of the language preference, provide subsequent web pages detailing the operational aspects of the data storage assembly in the particular language based on the language preference.

12. An electronic system as in claim 11 wherein the controller, when providing the subsequent web pages detailing the operational aspects of the data storage assembly in the particular language based on the language preference, is arranged to:
 dynamically construct the subsequent web pages from a language database which stores captions in the multiple selectable languages.

13. An electronic system as in claim 10 wherein the controller is further arranged to:
 store a set of files in the data storage assembly;
 maintain a search database of searchable content within the set of files;
 in response to a search command having a particular character string, access the search database to identify files having the particular character string within the set of files stored in the data storage assembly; and
 provide a search result web page to the web browser, the search result web page listing the files having the particular character string within the set of files stored in the data storage assembly.

14. An electronic system as in claim 13 wherein the controller, when maintaining the search database, is arranged to:
  update the search database in response to uploading a new file into the data storage assembly.

15. An electronic system as in claim 13 wherein the controller, when maintaining the search database, is arranged to:
  update the search database in response to closing an existing file in the data storage assembly.

16. An electronic system as in claim 10 wherein the controller is further arranged to:
  receive a selection command identifying a particular hypertext link arranged to open a web page which displays a list of files stored within a particular subfolder corresponding to a particular subfolder name displayed within the subfolder pathway; and
  provide another file listing web page to the browser, the other file listing web page rendering another list of files stored within a new current subfolder of the data storage assembly, and display a new subfolder pathway having (i) at least one parent subfolder name, (ii) a new current subfolder name corresponding to the new current subfolder, and (iii) a "/" separator between each subfolder name of the new subfolder pathway.

17. An electronic system as in claim 10 wherein the controller is further arranged to:
  provide a RAID level selection web page to the web browser, the RAID level selection web page (i) prompting the user to identify a RAID level preference identifying a particular RAID protection scheme among multiple available RAID protection schemes and (ii) displaying a pictorial disk view of each available RAID protection scheme.

18. An electronic system as in claim 17 wherein the controller is further arranged to:
  receive, from the web browser, the RAID level preference identifying the particular RAID protection scheme, the data storage assembly being arranged to commit to the particular RAID protection scheme in response to (i) deletion of earlier-stored data in the data storage assembly, (ii) receipt of the RAID level preference, and (iii) receipt of the commit command.

* * * * *